(12) United States Patent
Beda, III (10) Patent No.: US 8,677,449 B1
(45) Date of Patent: Mar. 18, 2014

(54) EXPOSING DATA TO VIRTUAL MACHINES (75) Inventor: Joseph S. Beda, III, Seattle, WA (US)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 13/424,013

(22) Filed: Mar. 19, 2012

(51) Int. Cl.
*G06F 21/00* (2013.01)

(52) U.S. Cl.
USPC ............................................................ 726/1

(58) Field of Classification Search
USPC ............................................................ 726/1
See application file for complete search history.

(56) References Cited

U.S. PATENT DOCUMENTS

| | | | |
|---|---|---|---|
| 5,463,768 A | 10/1995 | Cudihy et al. | |
| 5,655,081 A | 8/1997 | Bonnell et al. | |
| 5,778,444 A | 7/1998 | Langan et al. | |
| 5,794,224 A | 8/1998 | Yufik | |
| 6,148,368 A | 11/2000 | DeKoning | |
| 6,178,482 B1 | 1/2001 | Sollars | |
| 6,411,966 B1 | 6/2002 | Kwan et al. | |
| 6,449,671 B1 | 9/2002 | Patkar et al. | |
| 6,505,211 B1 | 1/2003 | Dessloch et al. | |
| 6,505,248 B1 | 1/2003 | Casper et al. | |
| 6,587,866 B1 | 7/2003 | Modi et al. | |
| 6,598,179 B1 | 7/2003 | Chirashnya et al. | |
| 6,643,613 B2 | 11/2003 | McGee et al. | |
| 6,829,678 B1 | 12/2004 | Sawdon et al. | |
| 6,891,839 B2 | 5/2005 | Albert et al. | |
| 6,898,697 B1 | 5/2005 | Gao et al. | |
| 6,996,502 B2 | 2/2006 | De La Cruz et al. | |
| 7,043,455 B1 | 5/2006 | Cuomo et al. | |
| 7,062,718 B2 | 6/2006 | Kodosky et al. | |
| 7,117,243 B2 | 10/2006 | Peart | |
| 7,466,703 B1 | 12/2008 | Arunachalam et al. | |
| 7,478,388 B1 | 1/2009 | Chen et al. | |
| 7,500,262 B1 | 3/2009 | Sanin et al. | |
| 7,529,836 B1 | 5/2009 | Bolen | |
| 7,584,467 B2 | 9/2009 | Wickham et al. | |
| 7,596,620 B1 | 9/2009 | Colton et al. | |
| 7,650,331 B1 | 1/2010 | Dean et al. | |
| 7,653,833 B1 | 1/2010 | Miller et al. | |

(Continued)

FOREIGN PATENT DOCUMENTS

| | | |
|---|---|---|
| EP | 0915419 | 5/1999 |
| EP | 1 130 845 | 9/2001 |

(Continued)

OTHER PUBLICATIONS

Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.

(Continued)

*Primary Examiner* — William Goodchild
(74) *Attorney, Agent, or Firm* — Fish & Richardson P.C.

(57) ABSTRACT

Methods, systems, and apparatus, including computer programs encoded on a computer storage medium, for exposing metadata to a virtual machine. In one aspect, a method includes executing a virtual machine on a host operating system. A synthetic file system is mounted on the virtual machine to expose the synthetic file system to a plurality of guest applications executing on the virtual machine. The synthetic file system is configured to provide a plurality of system calls to the guest applications including at least a read operation or a write operation for reading from or writing to external metadata stored outside the virtual machine.

20 Claims, 4 Drawing Sheets

(56) References Cited

U.S. PATENT DOCUMENTS

| | | |
|---|---|---|
| 7,761,573 B2 | 7/2010 | Travostino et al. |
| 7,804,862 B1 | 9/2010 | Olson et al. |
| 7,836,285 B2 | 11/2010 | Giri et al. |
| 8,051,414 B2 | 11/2011 | Stender et al. |
| 8,065,717 B2 | 11/2011 | Band |
| 8,103,771 B2 | 1/2012 | Tanaka et al. |
| 8,108,903 B2 | 1/2012 | Norefors et al. |
| 8,146,147 B2 | 3/2012 | Litvin et al. |
| 8,261,295 B1 | 9/2012 | Risbood et al. |
| 8,276,140 B1 | 9/2012 | Beda et al. |
| 8,296,459 B1 | 10/2012 | Brandwine et al. |
| 8,407,687 B2 | 3/2013 | Moshir et al. |
| 8,423,993 B2 | 4/2013 | Faus et al. |
| 8,484,353 B1 | 7/2013 | Johnson et al. |
| 8,504,844 B2 | 8/2013 | Browning |
| 8,533,796 B1 | 9/2013 | Shenoy et al. |
| 2002/0091902 A1 | 7/2002 | Hirofuji |
| 2002/0097747 A1 | 7/2002 | Kirkby |
| 2004/0139368 A1 | 7/2004 | Austen et al. |
| 2004/0148484 A1 | 7/2004 | Watanabe et al. |
| 2004/0210653 A1 | 10/2004 | Kanoor et al. |
| 2005/0010715 A1 | 1/2005 | Davies et al. |
| 2005/0166011 A1 | 7/2005 | Burnett et al. |
| 2005/0196030 A1 | 9/2005 | Schofield et al. |
| 2005/0216659 A1 | 9/2005 | Ogawa et al. |
| 2005/0237543 A1 | 10/2005 | Kikuchi |
| 2005/0289499 A1 | 12/2005 | Ogawa et al. |
| 2006/0026354 A1 | 2/2006 | Lesot et al. |
| 2006/0048077 A1 | 3/2006 | Boyles |
| 2006/0048130 A1 | 3/2006 | Napier et al. |
| 2006/0059228 A1 | 3/2006 | Kasamsetty et al. |
| 2006/0067236 A1 | 3/2006 | Gupta |
| 2006/0075199 A1 | 4/2006 | Kallahalla et al. |
| 2006/0098618 A1 | 5/2006 | Bouffioux |
| 2006/0136676 A1 | 6/2006 | Park et al. |
| 2006/0153099 A1 | 7/2006 | Feldman |
| 2006/0161753 A1 | 7/2006 | Aschoff et al. |
| 2006/0271547 A1 | 11/2006 | Chen et al. |
| 2007/0011361 A1 | 1/2007 | Okada et al. |
| 2007/0112956 A1 | 5/2007 | Chapman et al. |
| 2007/0118694 A1 | 5/2007 | Watanabe et al. |
| 2007/0123276 A1 | 5/2007 | Parker et al. |
| 2007/0177198 A1 | 8/2007 | Miyata |
| 2007/0199058 A1 | 8/2007 | Baumgart et al. |
| 2007/0271604 A1 | 11/2007 | Webster et al. |
| 2007/0280243 A1 | 12/2007 | Wray et al. |
| 2007/0288921 A1 | 12/2007 | King et al. |
| 2008/0028389 A1 | 1/2008 | Genty et al. |
| 2008/0086515 A1 | 4/2008 | Bai et al. |
| 2008/0095176 A1 | 4/2008 | Ong et al. |
| 2008/0107112 A1 | 5/2008 | Kuo et al. |
| 2008/0205415 A1 | 8/2008 | Morales |
| 2008/0208681 A1 | 8/2008 | Hammad et al. |
| 2008/0215796 A1 | 9/2008 | Lam et al. |
| 2008/0222246 A1 | 9/2008 | Ebling et al. |
| 2008/0222375 A1* | 9/2008 | Kotsovinos et al. ......... 711/162 |
| 2008/0244030 A1 | 10/2008 | Leitheiser |
| 2008/0244471 A1 | 10/2008 | Killian et al. |
| 2008/0250407 A1 | 10/2008 | Dadhia et al. |
| 2008/0270704 A1 | 10/2008 | He et al. |
| 2008/0304516 A1 | 12/2008 | Feng et al. |
| 2008/0307258 A1 | 12/2008 | Challenger et al. |
| 2008/0310324 A1 | 12/2008 | Chaponniere |
| 2009/0097657 A1 | 4/2009 | Schiedt et al. |
| 2009/0150629 A1 | 6/2009 | Noguchi et al. |
| 2009/0199177 A1 | 8/2009 | Edwards et al. |
| 2009/0222815 A1 | 9/2009 | Dake |
| 2009/0241108 A1 | 9/2009 | Edwards et al. |
| 2009/0249440 A1 | 10/2009 | Platt et al. |
| 2009/0276771 A1 | 11/2009 | Nickolov et al. |
| 2009/0282266 A1 | 11/2009 | Fries et al. |
| 2009/0300605 A1 | 12/2009 | Edwards et al. |
| 2009/0310554 A1 | 12/2009 | Sun et al. |
| 2010/0017859 A1 | 1/2010 | Kelly |
| 2010/0023582 A1 | 1/2010 | Pedersen et al. |
| 2010/0046426 A1 | 2/2010 | Shenoy et al. |
| 2010/0057913 A1 | 3/2010 | DeHaan |
| 2010/0071035 A1 | 3/2010 | Budko et al. |
| 2010/0088335 A1 | 4/2010 | Mimatsu |
| 2010/0094999 A1 | 4/2010 | Rama et al. |
| 2010/0095000 A1 | 4/2010 | Kettler et al. |
| 2010/0199089 A1 | 8/2010 | Vysogorets et al. |
| 2010/0212004 A1 | 8/2010 | Fu |
| 2010/0215050 A1 | 8/2010 | Kanada |
| 2010/0217927 A1 | 8/2010 | Song |
| 2010/0235649 A1 | 9/2010 | Jeffries et al. |
| 2010/0274984 A1 | 10/2010 | Inomata et al. |
| 2010/0287548 A1 | 11/2010 | Zhou et al. |
| 2010/0293285 A1 | 11/2010 | Oishi et al. |
| 2010/0303241 A1 | 12/2010 | Breyel |
| 2011/0010483 A1* | 1/2011 | Liljeberg ......................... 711/6 |
| 2011/0022812 A1 | 1/2011 | van der Linden et al. |
| 2011/0055361 A1 | 3/2011 | DeHaan |
| 2011/0085563 A1 | 4/2011 | Kotha et al. |
| 2011/0103389 A1 | 5/2011 | Kidambi et al. |
| 2011/0153697 A1* | 6/2011 | Nickolov et al. ............. 707/827 |
| 2011/0153838 A1 | 6/2011 | Belkine et al. |
| 2011/0191485 A1 | 8/2011 | Umbehocker |
| 2011/0191768 A1 | 8/2011 | Smith |
| 2011/0231280 A1 | 9/2011 | Farah |
| 2011/0258441 A1 | 10/2011 | Ashok et al. |
| 2012/0060018 A1* | 3/2012 | Shinde et al. ................. 712/220 |
| 2012/0072762 A1 | 3/2012 | Atchison et al. |
| 2012/0185688 A1 | 7/2012 | Thornton |
| 2012/0191912 A1 | 7/2012 | Kadatch et al. |
| 2012/0233282 A1 | 9/2012 | Voccio et al. |
| 2012/0233611 A1 | 9/2012 | Voccio |
| 2012/0233678 A1 | 9/2012 | Pal |
| 2012/0233705 A1 | 9/2012 | Boysen et al. |
| 2012/0246637 A1 | 9/2012 | Kreeger et al. |
| 2012/0266159 A1 | 10/2012 | Risbood et al. |
| 2013/0041872 A1 | 2/2013 | Aizman et al. |
| 2013/0055252 A1 | 2/2013 | Lagar-Cavilla et al. |
| 2013/0061226 A1 | 3/2013 | Ammons et al. |
| 2013/0074181 A1 | 3/2013 | Singh |
| 2013/0081014 A1 | 3/2013 | Kadatch et al. |
| 2013/0086585 A1 | 4/2013 | Huang et al. |
| 2013/0117801 A1 | 5/2013 | Shieh et al. |
| 2013/0212709 A1 | 8/2013 | Tucker |
| 2013/0227303 A1 | 8/2013 | Kadatch et al. |
| 2013/0262405 A1 | 10/2013 | Kadatch et al. |

FOREIGN PATENT DOCUMENTS

| | | |
|---|---|---|
| EP | 1234433 | 9/2005 |
| EP | 1 253 766 | 12/2005 |
| EP | 0909058 | 7/2010 |
| EP | 1694035 | 9/2012 |
| EP | 2163046 | 4/2013 |
| WO | WO2009/036803 | 3/2009 |
| WO | WO2009/100683 | 8/2009 |
| WO | WO 2010/085579 | 7/2010 |
| WO | WO 2011/095516 | 8/2011 |
| WO | WO 2012/039834 | 3/2012 |

OTHER PUBLICATIONS

Paravirtualization, Wikipedia Article, downloaded from http://en.wikipedia.org/wiki/Paravirtualization on Mar. 18, 2012.

Paravirtualized File Systems, Eric Van Hensbergen, downloaded from http://www.slideshare.net/ericvh/9p-on-kvm on Mar. 18, 2012.

Moller, Jan, et al., "Internal Network Security", Feb. 1, 2000-May 18, 2001, Retrieved from the Internet: <URL: http://www.daimi.au.dk/~fwiffo/thesis/>, 183 pages.

Primet, Pascale, et al.., "HIPCAL: State of the Art of OS and Network virtualization solutions for Grids", Sep. 14, 2007, 38 pages.

Wikipedia, "IPSec", [online] [retrieved on Jan. 4, 2011]. Retrieved from the Internet: <URL:http://en.wikipedia.org/wiki/IPsec/>, 8 pages.

Abdull, AlastairIrvine, et al. "Generic Routing Encapsulation", [online] [retrieved on Jan. 4, 2011]. Retrieved from the Internet: <URL: http://creativecommons.org/licenses/by-sa/3.0/>, 5 pages.

(56) References Cited

OTHER PUBLICATIONS

Farinacci et al., "RFC 2784: Generic Routing Encapsulation (GRE)", Mar. 2000, The Internet Society, 10 pages.
Kent et al., "RFC 4301: Security Architecture for the Internet Protocol", Dec. 2005, The Internet Society, 102 pages.
Wikipedia, "Domain Name System". [online] [Retrieved on Feb. 4, 2012]. Retrieved from the Internet: <URL: http://en.wikipedia.org/wiki/Domain_Name_System>, 13 pages.
Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.
Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.
Wikipedia. "OAuth." [online] [Retrieved on Jan. 20, 2011]. Retrieved from the Internet <URL: http://en.wikipedia.org/wiki/OAuth> , 3 pages.
Gowalla. "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL:http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
Travostino, Franco, et al., Seamless Live Migration of Virtual Machines over the MAN/WAN, 2006, Elsevier Future Generation Computer Systems 2006, 10 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling-Getting Started Guide-API Version Aug. 1, 2010. Amazon Web Services LLC, 2010, 20 pages.
Amazon Auto Scaling—Developer Guide—API Version Aug. 1, 2010. Amazon Web Services LLC, 2011, 62 pages.
Amazon CloudWatch-Developer Guide-API Version Aug. 1, 2010. Amazon Web Services LLC, 2010, 75 pages.
Benincosa. "Ganglia and Nagios, Part 2: Monitor enterprise clusters with Nagios-Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.
"IPsec". Creativecommons.org [online]. Creative Commons Attribution-Share Alike 3.0 Unported. [retrieved on Jan. 14, 2011]. Retrieved from the Internet<URL: http://creativecommons.org/licenses/by-sa/3.0/>, pp. 1-8.
"Generic Routing Encapsulation". Creativecommons.org [online]. Creative Commons Attribution-Share Alike 3.0 Unported. [retrieved on Jan. 14, 2011]. Retrieved from the Internet:<URL: http://creativecommons.org/licenses/by-sa/3.0/ >, pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange.com, Retrieved from the Internet on Nov. 18, 2011; Retrieved from: <URL:http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.
Using and Managing AWS—Part 6: SSH Key Pairs, Top WordPress, May 26, 2009, Retrieved from the Internet: <URl: http://clouddb.info/2009/05/26/using-and-managing-aws-part-6-ssh-key-pairs>, 5 pages.
Live Migration of Virtual Machines, Clark et al., University of Cambridge Laboratory, Department of Computer Science; University of Copenhagen, Denmark, 2005; 14 pages.
Making Services Easy to Migrate, Debian Administration, System Administration Tips and Resources, Jan. 1, 2005, 5 pages.
L. Gommans, et al., Token-Based Authorization of Connection Oriented Network Resources, 1st International Workshop on Networks for Grid Applications (GridNets 2004), Oct. 29, 2004; 8 pages.
Hyun, Ahn Ji, Authorized Officer for Korean Intellectual Property Office, International Search Report and Written Opinion for PCT/US2012/021846, International Search Report completed May 25, 2012, 8 pages.

(56) References Cited

OTHER PUBLICATIONS

Na, Lee Da, Authorized Officer for Korean Intellectual Property Office, International Search Report and Written Opinion for PCT/US2012/020954, International Search Report completed Aug. 23, 2012, 10 pages.

Alpern, B., "The Jalapeno virtual machine," IBM Systems Journal, Jan. 2000, vol. 39, Issue 1, pp. 211-238.

Bok, Jin Yo, Authorized Officer for Korean Intellectual Property Office, International Search Report and Written Opinion for PCT/US2012/029210, International Search Report completed Oct. 10, 2012, 2 pages.

Anonymous, Storage I/O Control Technical Overview and Consideration for Deployment VMware vSphere ™ 4.1, Jan. 1, 2010, XP05504491, retrieved from the internet: URL: http://www.vmware.com/fled/pdf/techpaper/WMW-vSphere41-SIOC.pdf; [retrieved on Nov. 21, 2012], the entire document.

Cabellos et al., LISPmob: Mobile Networking through LISP, Apr. 2, 2012, 8 pages.

Steinmetz, Christof, Authorized Office for European Patent Office, International Search Report and Written Opinion for PCT/US2013/034140, completed Jun. 25, 2013, 21 pages.

Hehn, Eva, Authorized Office for European Patent Office, International Search Report and Written Opinion for PCT/US2013/027456, completed Jun. 24, 2013, 11 pages.

Eng, Lili, Australian Government, IP Australia, Examiner's First Report for 2012200562, dated Jun. 4, 2012, 2 pages.

\* cited by examiner

EXPOSING DATA TO VIRTUAL MACHINES

BACKGROUND

This specification relates to virtual machine systems, and more specifically to mounting a synthetic file system on a virtual machine.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on the server farm simplifies management of end user computing devices. Some cloud computing services allow end users to execute software applications in virtual machines.

SUMMARY

A virtual machine system mounts a synthetic file system in a virtual machine. A guest application executing on the virtual machine accesses metadata that is stored outside the virtual machine using the synthetic file system. The guest application can read and write to the metadata. The synthetic file system is configured to enforce a security policy for the metadata by controlling access to the metadata by guest applications.

In general, one aspect of the subject matter described in this specification can be embodied in methods that include the actions of executing a virtual machine on a host operating system; mounting a synthetic file system on the virtual machine to expose the synthetic file system to a plurality of guest applications executing on the virtual machine, wherein the synthetic file system is configured to provide a plurality of system calls to the guest applications including at least a read operation or a write operation for reading from or writing to an external data repository storing data outside the virtual machine; receiving a first system call of the plurality of system calls at the synthetic file system for the read operation or the write operation from a first guest application of the plurality of guest applications; determining that the first guest application is not authorized for the first system call by a security policy associated with the synthetic file system; and denying access to the external data repository to the first guest application. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. Determining that the first guest application is not authorized for the first system call by the security policy comprises: translating the first system call into a server request; and providing the server request to a trusted agent, the trusted agent being a process executing on the virtual machine. The trusted agent is configured to send the server request to a server external to the virtual machine, the server being configured to access the external data repository. The server is configured to provide a token to the trusted agent during a booting process for the virtual machine; and the trusted agent is configured to provide the token to the server with the server request. The server is configured to provide the token to the virtual machine only once; and the trusted agent is configured to shut down the virtual machine when, during the booting process, the trusted agent requests the token and the metadata server denies the request for the token. The synthetic file system is implemented using Filesystem in Userspace (FUSE). Determining that the first guest application is not authorized for the first system call by the security policy comprises: translating the first system call into a host request; and providing the host request to a virtual machine monitor, the virtual machine monitor being a process executing on the host operating system and not on the virtual machine, the virtual machine monitor having access to the external data repository. Translating the first system call into a host request comprises serializing the first system call and information identifying the first guest application into the host request. Providing the host request to the virtual machine monitor comprises using a ring buffer that is shared between the virtual machine and the host operating system. The system of one or more computers is a host machine executing the host operating system, and wherein the virtual machine executes a guest operating system that controls the execution of the guest applications within the virtual machine and provides services to the guest applications.

Particular embodiments of the subject matter described in this specification can be implemented so as to realize one or more of the following advantages. Sensitive information can be passed from a virtual machine monitor into a virtual machine while maintaining access control to the sensitive information. Two-way communication between a virtual machine and a virtual machine monitor can be enabled by a synthetic file system while still allowing access control for sensitive information.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
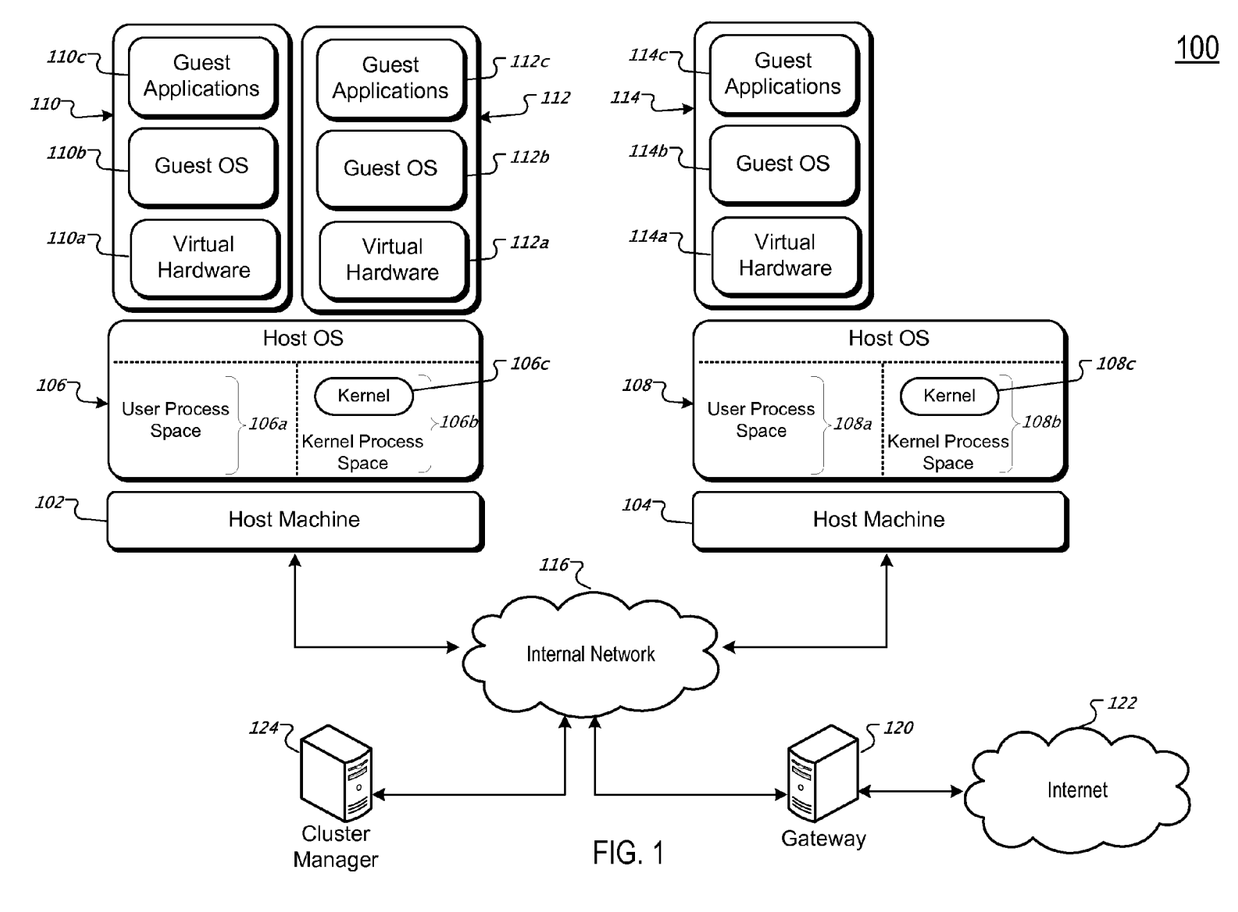
FIG. 1 is a schematic illustration of an example virtual machine system.

FIG. 1 is a schematic illustration of an example virtual machine system 100. The system includes one or more host machines such as, for example, host machine 102 and host machine 104. Generally speaking, a host machine is one or more computers such as a rack mounted servers or other computing devices. Host machines can have different capabilities and computer architectures. Host machines can communicate with each other through an internal data communications network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatus responsible for routing data communication traffic between the internal network 116 and the Internet 122. Other types of external networks are possible.

Each host machine executes a host operating system which is software that can manage concurrent execution of one or more virtual machines. For example, the host operating system 106 is managing virtual machine (VM) 110 and VM 112, while host OS 108 is managing a single VM 114. Each VM includes simulated hardware referred to as virtual hardware (e.g., virtual hardware 110a, 112a and 114a). The virtual hardware can be a simulated version of the underlying host machine hardware or a simulated version of other types of hardware. Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine can include one or more processors that include processor-level mechanisms to enable virtual hardware to execute software applications efficiently by allowing guest software instructions to be executed directly on the host machine's microprocessor without requiring code-rewriting, recompilation, or instruction emulation.

Each VM 110, 112, 114 is allocated a set of virtual memory pages from the virtual memory of the underlying host operating system and is allocated virtual disk blocks from one or more virtual disk drives for use by the guest software executing on the VM. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers. Other address schemes are possible. The VM IP addresses are visible on the internal network 116 and, in some implementations, are visible on the Internet 122 if the addresses are advertised using a suitable routing protocol, for instance.

A VM's guest software can include a guest operating system 110b, 112b, 114b which is software that controls the execution of respective guest software applications 110c, 112c, 114c within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106c which can include kernel extensions and device drivers, for instance. The kernel process space has elevated privileges; that is, the kernel 106c is allowed to perform certain privileged operations that are denied to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

The virtual machines 110, 112, and 114 can be grouped together into a cluster. For example, the virtual machines 110, 112, and 114 can be grouped into a cluster for a geographic region, and the cluster can be implemented as a data center, a physical facility that houses computer systems and associated components, e.g., power supplies, environmental controls, and security devices. An optional cluster manager 124 can be configured to coordinate operations in a cluster and coordinate operations with cluster managers of other clusters. The cluster manager 124 can be implemented as a system of one or more computers.

The cluster managers 124 can implement a global virtual machine application programming interface (API) for virtual machine administrators to manage and perform operations on virtual machines in clusters of any region. An API is an interface that provides interactivity between software modules. An API allows one software component to access particular services implemented by another software component. An API defines the language and parameters that API calling software modules use when accessing the particular services that have been implemented.

The global virtual machine API implemented by the cluster manager 124 provides the functionality for administrators to perform various operations for controlling virtual machines in one or more regions. For example, an administrator in a first region can use the API to start a virtual machine in a different second region. Example API calls can include calls that perform the operations of starting a particular number of virtual machines, starting a particular number of virtual machines in one or more particular regions, specifying or uploading a particular virtual machine image, starting a virtual machine from a particular virtual machine image, migrating a particular virtual machine image from one region to another region, stopping virtual machines in one or more regions, specifying or uploading an update to an existing virtual machine image, in addition to a variety of other commands.

In some implementations, the cluster manager 124 accesses a globally replicated database storing information about allocation of system resources. The database can keep track of, for example, the number, type, and status of virtual machines allocated to a particular user account. When virtual machines are started or terminated in a particular region, the cluster manager server for that region can update the database accordingly. Changes can be replicated to other geographic regions of for use by the other cluster managers.

Figure 2:
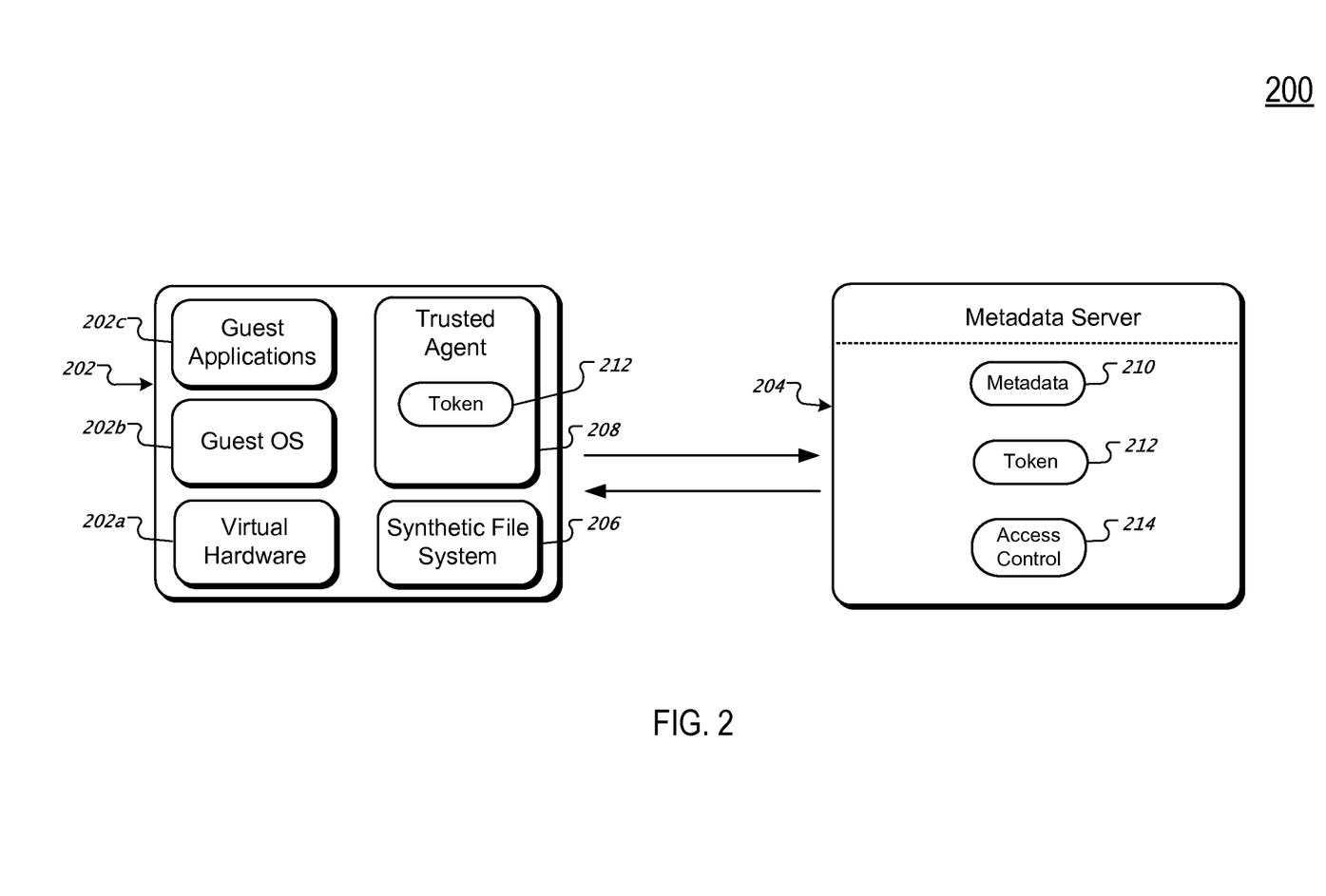
FIG. 2 is a schematic illustration of an example virtual machine system including a synthetic file system.

FIG. 2 is a schematic illustration of an example virtual machine system 200 including a synthetic file system 206. The system includes a virtual machine 202 in communication with a metadata server 204. The virtual machine 202 communicates with the metadata server 204 through a host OS.

The metadata server 204 can be executed on the same host OS as the virtual machine 202, or the metadata server 204 can be executed on a system external to the host OS of the virtual machine 202. The metadata server 204 can be a Hypertext Transfer Protocol (HTTP) server, for example, and can be set up for the sole use of the virtual machine 202.

The metadata 210 can be status and configuration information for the virtual machine 202 exchanged with a cluster manager, e.g., the cluster manager 124 of FIG. 1. Examples of configuration information include basic data about the virtual machine (e.g., geographic location of the cluster executing the virtual machine, network settings) and arbitrary information provided by an end user through a global virtual machine API. In addition, the metadata 210 can include information to provide access to extended services, e.g., authentication secrets. Furthermore, the metadata server can expose the internal status of the virtual machine 202, e.g., status and statistics about processes executing on the virtual machine 202. The metadata 210 can be coordinated by a cluster manager using the API.

The virtual machine 202 includes virtual hardware 202a, a guest OS 202b, and guest applications 202c, e.g., as described above with reference to FIG. 1. The virtual machine also includes a synthetic file system 206. The synthetic file system 206 is an interface to external metadata 210 on the metadata server 204. The synthetic file system 206 is mounted like a file system that provides access to a disk-based file system, but instead of providing access to a disk, it provides access to the external metadata 210. Guest applications 202c can access the external metadata 210, for example, using the same system calls used to access disk-based files. The synthetic file system 206 provides at least a read operation and a write operation to guest applications 202c of the virtual machine 202.

The virtual machine 202 can be booted from a generic boot image, e.g., used to boot various virtual machines. To customize the virtual machine 202, additional information can be passed to the virtual machine 202 as external metadata 210. Some types of external metadata 210 can be sensitive, for example, user names and passwords. Using the synthetic file system 206, sensitive metadata can be restricted, e.g., to different user accounts or security principals in the virtual machine 202.

When a guest application accesses sensitive metadata using a file system call to the synthetic file system 206, the synthetic file system 206 translates the file system call to a server request, which can be processed by a trusted agent 208. The trusted agent 208 is a process that communicates with the metadata server 204 to read to and write from external metadata 210.

While the virtual machine 202 is booting, the trusted agent 208 requests a token 212 from the metadata server 204. In general, the token 212 can be any shared information used to authenticate the trusted agent 208 to the metadata server 204. The metadata server 204 can generate the token 212 responsive to the request for a token and associated the token 212 with the requesting trusted agent 208. For example, where the metadata server 204 is set up for the sole use of the virtual machine 202, the metadata server 204 can be configured to provide the token 212 to the virtual machine 202 only once for each time the virtual machine 202 is booted. Hence, the metadata server 204 will deny a request for the token 212 to any guest application that requests the token 212 after the trusted agent 208 requests the token 212.

The trusted agent 208 can then pass the token 212 back to the metadata server 204 with server requests. The metadata server 204 can trust the trusted agent 208 because it can provide the token 212 with its requests. If the trusted agent 208 requests the token 212 from the metadata server 204 and is denied (e.g., because some other application has already requested it), the trusted agent 208 can shut down the virtual machine 202.

The trusted agent 208 receives access control information 214 from the metadata server 204. The access control information 214 specifies which guest applications, or other types of accounts on the virtual machine 202, can access the external metadata 210. That information can be exposed via the synthetic file system 206, e.g., in the same manner that disk file permissions are exposed by the virtual hardware 202a. For example, a guest application can make a system call to the synthetic file system 206 to determine whether it has access to the external metadata 210 in the same way it would make a system call to a disk file system.

The synthetic file system 206 can be implemented, for example, using Filesystem in Userspace (FUSE), a kernel module for certain operating systems. FUSE is useful because it can be used to create a synthetic filesystem without editing the system kernel.

Figure 3:
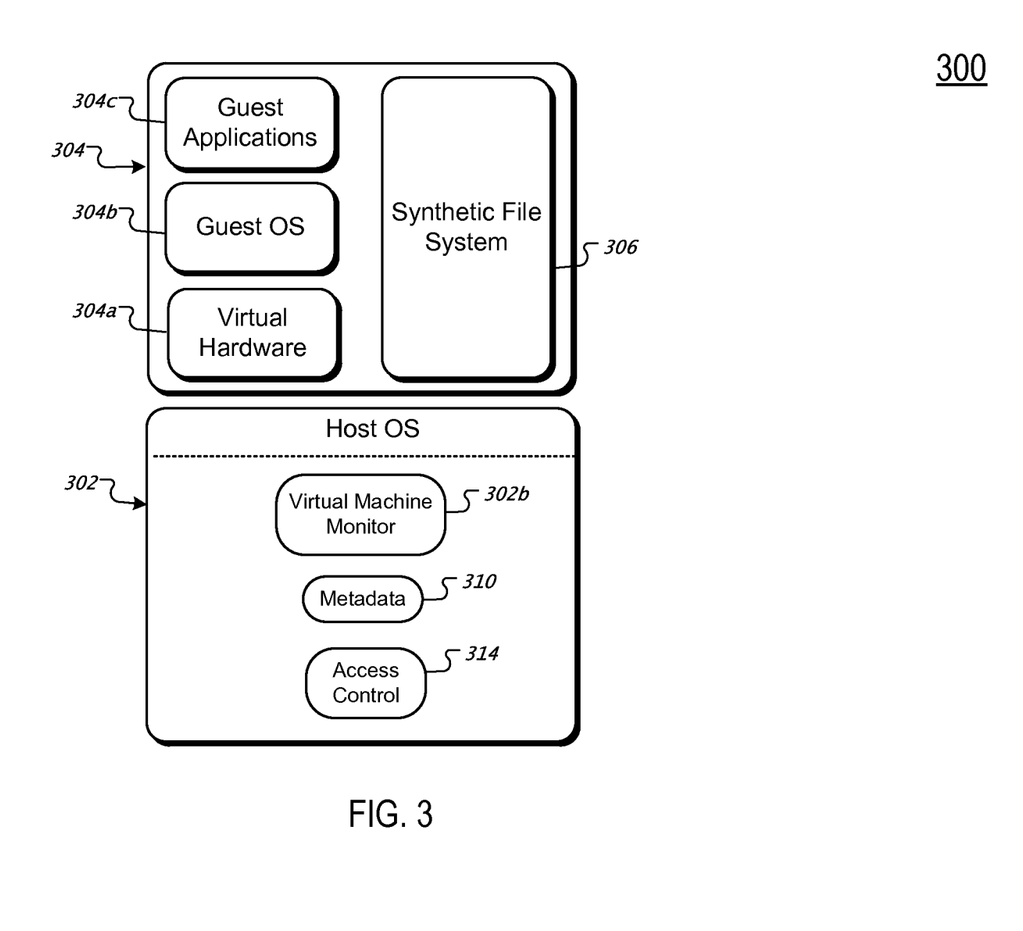
FIG. 3 is a schematic illustration of an example virtual machine system including a different synthetic file system.

FIG. 3 is a schematic illustration of an example virtual machine system 300 including a different synthetic file system 306. A host OS 302 executes a virtual machine monitor 302b to monitor a virtual machine 304. The virtual machine monitor 302b can perform various monitoring functions; for purposes of illustration, only certain functions are described with reference to FIG. 3.

The virtual machine includes virtual hardware 304a, a guest OS 304b, and guest applications 304c, e.g., as described above with reference to FIG. 1. The host OS mounts a synthetic file system 306 on the virtual machine 304. The synthetic file system 306 is an interface to external metadata 310 available to the host OS. The synthetic file system 306 can be implemented by a software driver and a paravirtualized hardware component, e.g., so that the synthetic file system 306 is a component of the guest OS 304b and virtual hardware 304a. Guest applications 304c can access the external metadata 310 using system calls to the synthetic file system 306. The system calls include at least a read operation and a write operation.

The synthetic file system 306 also exposes access control information 314 for the external metadata 310 to the guest applications 304c, e.g., in the same manner that disk file permissions are exposed by the virtual hardware 304a. For example, a guest application can make a system call to the synthetic file system 306 to determine whether it has access to the external metadata 310 in the same way it would make a system call to a disk file system.

The synthetic file system 306 redirects a system call for the external metadata 310 into the host OS 302 to be handled by the virtual machine monitor 302b. The virtual machine monitor 302b, using the access control information 314, determines whether or not the guest application or other process making the system call has appropriate access for the system call. The virtual machine monitor 302b can enforce various security policies for accessing the external metadata 310.

The synthetic file system 306 can be implemented, for example, using a 9P file system and Virtio. 9P is a protocol that is useful for passing data between a virtual machine and its host OS, and Virtio is a standard for paravirtualized network and disk device drivers that can be used by guest applications cooperatively with a host OS in a virtual computing system. Virtio can be used to provide a ring buffer protocol for passing information between a virtual machine and its host.

In general, the synthetic file system 306 can be implemented using any of various appropriate tools. The synthetic file system 306 can serialize a system call and pass the serialized system call to the virtual machine monitor 302b. The serialized system call includes, for example, information about the requesting guest application or process so that the virtual machine monitor 302b can enforce the security policy.

When the synthetic file system 306 receives a system call and serializes the system call, the synthetic file system 306 can cause the running thread of the virtual machine 304 to exit so that the virtual machine monitor 302b can execute. The synthetic file system 306 passes the serialized system call to the virtual machine monitor 302b, for example, using a ring buffer that is shared between the virtual machine 304 and the host OS 302.

Figure 4:
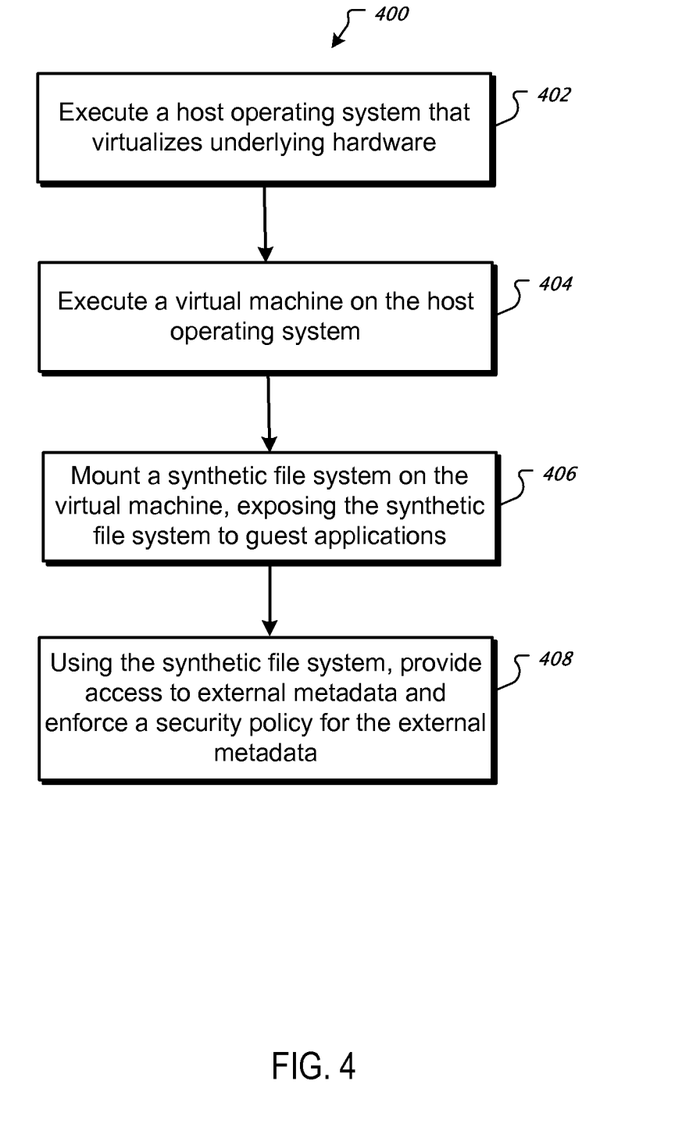
FIG. 4 is a flow diagram of an example process for exposing metadata to a virtual machine.

FIG. 4 is a flow diagram of an example process 400 for exposing metadata to a virtual machine. In some implementations, a system of one or more computers performs the process 400. For example, the host machine 102 of FIG. 1 may perform the process 400. For convenience, the process will be described with respect to a system that performs the process 400.

The system executes a host operating system (step 402). The host operating system can manage concurrent execution of one or more virtual machines, e.g., as described above with reference to FIG. 1.

The system executes a virtual machine on the host operating system (step 404). The virtual machine can execute a guest operating system that controls the execution of one or more guest applications within the virtual machine and provides services to the guest applications, e.g., as described above with reference to FIG. 1. The virtual machine can virtualize underlying hardware of the system or other hardware.

The system mounts a synthetic file system on the virtual machine, exposing the synthetic file system to one or more guest applications executing on the virtual machine (step 406). The synthetic file system is configured to perform system calls for the guest applications. The system calls include at least a read operation and a write operation for reading from and writing to external metadata stored outside the virtual machine. For example, the synthetic file system can be the synthetic file system 206 of FIG. 2 or the synthetic file system 306 of FIG. 3.

Using the synthetic file system, the system provides access to the external metadata and enforces a security policy for the external metadata (step 408). The synthetic file system is configured to enforce the security policy by denying access to the external metadata to at least one of the guest applications.

For example, the synthetic file system can receive a system call for the read operation or the write operation from a guest application. The system determines that the guest application is not authorized for the first system call by a security policy associated with the synthetic file system. The security policy is associated with the synthetic file system, for example, by a metadata server as described above with reference to FIG. 2, or by a virtual machine monitor as described above with reference to FIG. 3. The system denies access to the external metadata to the first guest application. For example, the synthetic file system can return an error value to the requesting guest application.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a system of one or more computers, the method comprising:
   executing a virtual machine on a host operating system;
   mounting a synthetic file system on the virtual machine to expose the synthetic file system to a plurality of guest applications executing on the virtual machine, wherein the synthetic file system is configured to provide a plurality of system calls to the guest applications including at least a read operation or a write operation for reading from or writing to an external data repository storing data outside the virtual machine;

receiving a first system call of the plurality of system calls at the synthetic file system for the read operation or the write operation from a first guest application of the plurality of guest applications;

determining that the first guest application is not authorized for the first system call by a security policy associated with the synthetic file system, wherein determining that the first guest application is not authorized for the first system call by the security policy comprises:

translating the first system call into a server request; and providing the server request to a trusted agent, the trusted agent being a process executing on the virtual machine, wherein the trusted agent is configured to send the server request to a server external to the virtual machine, the server being configured to access the external data repository, and wherein the server is configured to provide a token to the trusted agent during a booting process for the virtual machine, and the trusted agent is configured to provide the token to the server with the server request; and denying access to the external data repository to the first guest application.

2. The method of claim 1, wherein:

the server is configured to provide the token to the virtual machine only once; and the trusted agent is configured to shut down the virtual machine when, during the booting process, the trusted agent requests the token and the metadata server denies the request for the token.

3. The method of claim 2, wherein the synthetic file system is implemented using Filesystem in Userspace (FUSE).

4. The method of claim 1, wherein determining that the first guest application is not authorized for the first system call by the security policy comprises:

translating the first system call into a host request; and providing the host request to a virtual machine monitor, the virtual machine monitor being a process executing on the host operating system and not on the virtual machine, the virtual machine monitor having access to the external data repository.

5. The method of claim 4, wherein translating the first system call into a host request comprises serializing the first system call and information identifying the first guest application into the host request.

6. The method of claim 4, wherein providing the host request to the virtual machine monitor comprises using a ring buffer that is shared between the virtual machine and the host operating system.

7. The method of claim 1, wherein the system of one or more computers is a host machine executing the host operating system, and wherein the virtual machine executes a guest operating system that controls the execution of the guest applications within the virtual machine and provides services to the guest applications.

8. A system of one or more computers configured to perform operations comprising:

executing a virtual machine on a host operating system;

mounting a synthetic file system on the virtual machine to expose the synthetic file system to a plurality of guest applications executing on the virtual machine, wherein the synthetic file system is configured to provide a plurality of system calls to the guest applications including at least a read operation or a write operation for reading from or writing to an external data repository storing data outside the virtual machine;

receiving a first system call of the plurality of system calls at the synthetic file system for the read operation or the write operation from a first guest application of the plurality of guest applications;

determining that the first guest application is not authorized for the first system call by a security policy associated with the synthetic file system, wherein determining that the first guest application is not authorized for the first system call by the security policy comprises:

translating the first system call into a server request; and providing the server request to a trusted agent, the trusted agent being a process executing on the virtual machine, wherein the trusted agent is configured to send the server request to a server external to the virtual machine, the server being configured to access the external data repository, and wherein the server is configured to provide a token to the trusted agent during a booting process for the virtual machine, and the trusted agent is configured to provide the token to the server with the server request; and denying access to the external data repository to the first guest application.

9. The system of claim 8, wherein:

the server is configured to provide the token to the virtual machine only once; and the trusted agent is configured to shut down the virtual machine when, during the booting process, the trusted agent requests the token and the metadata server denies the request for the token.

10. The system of claim 9, wherein the synthetic file system is implemented using Filesystem in Userspace (FUSE).

11. The system of claim 8, wherein determining that the first guest application is not authorized for the first system call by the security policy comprises:

translating the first system call into a host request; and providing the host request to a virtual machine monitor, the virtual machine monitor being a process executing on the host operating system and not on the virtual machine, the virtual machine monitor having access to the external data repository.

12. The system of claim 11, wherein translating the first system call into a host request comprises serializing the first system call and information identifying the first guest application into the host request.

13. The system of claim 11, wherein providing the host request to the virtual machine monitor comprises using a ring buffer that is shared between the virtual machine and the host operating system.

14. The system of claim 8, wherein the system of one or more computers is a host machine executing the host operating system, and wherein the virtual machine executes a guest operating system that controls the execution of the guest applications within the virtual machine and provides services to the guest applications.

15. A computer storage medium encoded with a computer program, the program comprising instructions that when executed by one or more computers cause the one or more computers to perform operations comprising:

executing a virtual machine on a host operating system;

mounting a synthetic file system on the virtual machine to expose the synthetic file system to a plurality of guest applications executing on the virtual machine, wherein the synthetic file system is configured to provide a plurality of system calls to the guest applications including at least a read operation or a write operation for reading from or writing to an external data repository storing data outside the virtual machine;

receiving a first system call of the plurality of system calls at the synthetic file system for the read operation or the write operation from a first guest application of the plurality of guest applications;

determining that the first guest application is not authorized for the first system call by a security policy associated with the synthetic file system, wherein determining that the first guest application is not authorized for the first system call by the security policy comprises:
translating the first system call into a server request; and
providing the server request to a trusted agent, the trusted agent being a process executing on the virtual machine, wherein the trusted agent is configured to send the server request to a server external to the virtual machine, the server being configured to access the external data repository, and wherein the server is configured to provide a token to the trusted agent during a booting process for the virtual machine, and the trusted agent is configured to provide the token to the server with the server request; and denying access to the external data repository to the first guest application.

16. The computer storage medium of claim 15, wherein:
the server is configured to provide the token to the virtual machine only once; and
the trusted agent is configured to shut down the virtual machine when, during the booting process, the trusted agent requests the token and the metadata server denies the request for the token.

17. The computer storage medium of claim 16, wherein the synthetic file system is implemented using Filesystem in Userspace (FUSE).

18. The computer storage medium of claim 15, wherein determining that the first guest application is not authorized for the first system call by the security policy comprises:
translating the first system call into a host request; and
providing the host request to a virtual machine monitor, the virtual machine monitor being a process executing on the host operating system and not on the virtual machine, the virtual machine monitor having access to the external data repository.

19. The computer storage medium of claim 18, wherein translating the first system call into a host request comprises serializing the first system call and information identifying the first guest application into the host request.

20. The computer storage medium of claim 18, wherein providing the host request to the virtual machine monitor comprises using a ring buffer that is shared between the virtual machine and the host operating system.

* * * * *